United States Patent [19]

Wilkinson

[11] 4,355,619

[45] Oct. 26, 1982

[54] FAST RESPONSE TWO COIL SOLENOID DRIVER

[75] Inventor: John R. Wilkinson, Dearborn, Mich.

[73] Assignee: The Bendix Corporation, Southfield, Mich.

[21] Appl. No.: 193,331

[22] Filed: Oct. 1, 1980

[51] Int. Cl.³ .................. F02B 3/00; H01H 47/04
[52] U.S. Cl. ........................ 123/490; 123/478; 361/152; 361/154
[58] Field of Search ............... 123/478, 490; 361/152, 361/154, 210

[56] References Cited

U.S. PATENT DOCUMENTS

| | | | |
|---|---|---|---|
| 3,170,095 | 2/1965 | Goldstein | 361/152 |
| 3,700,985 | 10/1972 | Applequist | 361/154 |
| 3,737,736 | 6/1973 | Stampfli | 361/154 |
| 3,884,195 | 5/1975 | Murtin | |
| 3,942,485 | 3/1976 | Suda et al. | |
| 4,114,184 | 9/1978 | Stampfli | 361/154 |

FOREIGN PATENT DOCUMENTS 2913576 8/1979 Fed. Rep. of Germany ...... 361/152
1427995 3/1976 United Kingdom .

Primary Examiner—P. S. Lall
Attorney, Agent, or Firm—Markell Seitzman; Russel C. Wells

[57] ABSTRACT

A system for energizing a fuel injector, of a fuel injected engine having a metering chamber and a two coil solenoid operatively situated thereto for permitting a controlled quantity of fuel to flow therein. The system includes a pulse generator for generating a plurality of timing and fuel metering pulse width signals in synchronism with the combustion process within a cylinder of the engine, a voltage boost circuit responsive to timing and metering pulses and means for transferring, in seriatim energy from the boost circuit to a first low inductance pull-in coil and for energizing a second high inductance hold coil.

16 Claims, 5 Drawing Figures

FAST RESPONSE TWO COIL SOLENOID DRIVER

BRIEF DESCRIPTION OF THE PRIOR ART AND SUMMARY OF THE INVENTION

The invention relates to a driver circuit and method of controlling the modes of operation of a solenoid having two coils. More particularly, the invention relates to a fuel injection control system for controlling the operation of an electromagnetic fuel injector for internal combustion diesel engines.

Many techniques have been developed for controlling the operation of electromagnetic solenoids. These techniques often result in solenoid operation having a sluggish response time. When the speed of operation of the solenoid is an important feature the solenoid is often overdriven which results in excessive heating. Heat dissipation is also a problem with solenoids that have long duty cycles. Fast opening solenoids that are characterized by low power dissipation and low current requirements are significant considerations when incorporated within the mobile environment of an automotive fuel injection system to prevent excessive current drain from the battery. A reduced current drain is especially important during cold starts because of the lowered capacity of the battery.

It is desirable to control injector operation to provide repeatable intervals of fuel injection throughout the dynamic range of engine operating conditions. Errors in the amount of fuel that is injected into each of the combustion chambers of an engine, due to a lack of repeatability, will produce degraded performance, poor acceleration, smoke and noxious exhaust fumes.

It is an object of the present invention to rapidly open a solenoid having a pull-in and a hold coil. It is a further object of the present invention to provide a driving circuit for a two coil electromagnetic fuel injector. Another object of the invention is to accurately meter fuel to an injector, having a metering chamber therein. A further object of the present invention is to operate a plurality of fuel injectors at reduced levels of heat and current drain. A feature of the present invention is the use of a two coil solenoid in cooperation with a driver circuit. The two coil solenoid allows the freedom of using a first low inductance pull-in coil for fast pull-in and a many turn, high inductance hold coil for low current draw during the period of fuel metering during which time the solenoid is held open.

According to the specific circuitry described in detail below, the invention is a system including a driver circuit that is used to activate a solenoid of a diesel fuel injector. The solenoid being of the type comprising at least two coils, including a pull-in coil and a hold coil that are magnetically coupled one to the other. The solenoid further having a plunger that is movable in response to the magnetic fields generated by each coil. The fuel injector is of the type having a metering chamber and a solenoid that is operatively connected thereto to permit fuel to flow into the metering chamber prior to injection of fuel into the engine in response to solenoid control or activation signals. The driver circuit includes a signal generator including an electronic control circuit responsive to at least one engine operating parameter for generating a plurality of periodic signals that are synchronized to the combustion process within each cylinder of the engine. A boost circuit, responsive to a first or boost signal and connected to the engine battery is used to develop a voltage that is substantially larger than the battery voltage. A first switch responsive to a second or pull-in signal and connected to the boost circuit and to the pull-in coil is utilized for transferring the electrical energy within the boost circuit to the pull-in coil to initially move the solenoid plunger to permit fuel to flow into the metering chamber; and a second switch, responsive to a variable duration third or metering signal to activate the hold coil and to maintain or hold the plunger in its activated position at a reduced current drain level.

Many other objects, features and purposes of the invention will be clear from the detailed description of the drawings.

DETAILED DESCRIPTION OF THE DRAWINGS

Figure 1:
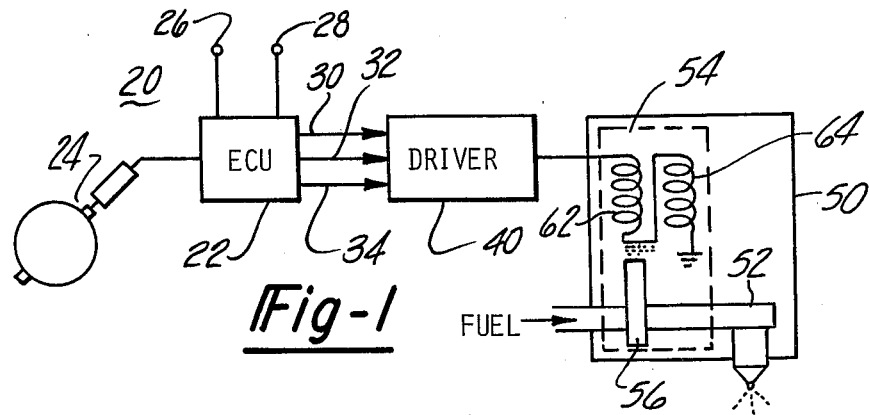
FIG. 1 illustrates a fuel control system.

Reference is made to FIG. 1 which illustrates a fuel injection system 20 comprising an electronic control unit or ECU 22 of a known variety connected with a plurality of sensors such as sensors 24, 26 and 28 which translate operational parameters of the engine such as crankshaft position, temperature and pressure respectively, into input signals for the electronic control unit 22. The electronic control unit 22 produces a plurality of output signals which are synchronized to an engine event, such as the combustion process within each of the combustion chambers or cylinders of the engine. The electronic control unit 22 produces a plurality of timing and metering signals which transforms the operational parameters of the engine into variable metering intervals during which time specific quantities of fuel are metered to a metering chambers 52 within each fuel injector 50 prior to being injected into the corresponding cylinders of the internal combustion engine in accordance with engine demand. These timing and metering signals are transferred to a driver circuit 40 via a plurality of lines such as lines 30, 32 and 34. Injector 50 is of the type having a metering chamber 52 and a solenoid 54. One such injector containing a metering chamber is disclosed in the commonly assigned U.S. Pat. No. 4,281,792 entitled "Single Solenoid Unit Injector", by Sisson et al, which is herein incorporated by reference. The solenoid comprises a core, a movable plunger 56 operatively situated relative to the metering chamber 52 to control fuel flow therein and a pull-in coil 62 and a hold coil 64 that are magnetically coupled onto the other. The driver circuit 40 is connected to the injector 50 and selectively energizes each coil in response to the timing and metering pulses. Upon energizing the coils 62 and 64 the plunger 56 is displaced for a determinable period thus enabling a determinable quantity of fuel to enter the metering chamber 52. Subsequently the fuel in the metering chamber 52 is mechanically injected into the engine. The mechanism for injecting the fuel is not shown in FIG. 1, however, typical mechanisms are illustrated by Sisson et al.

Figure 2:
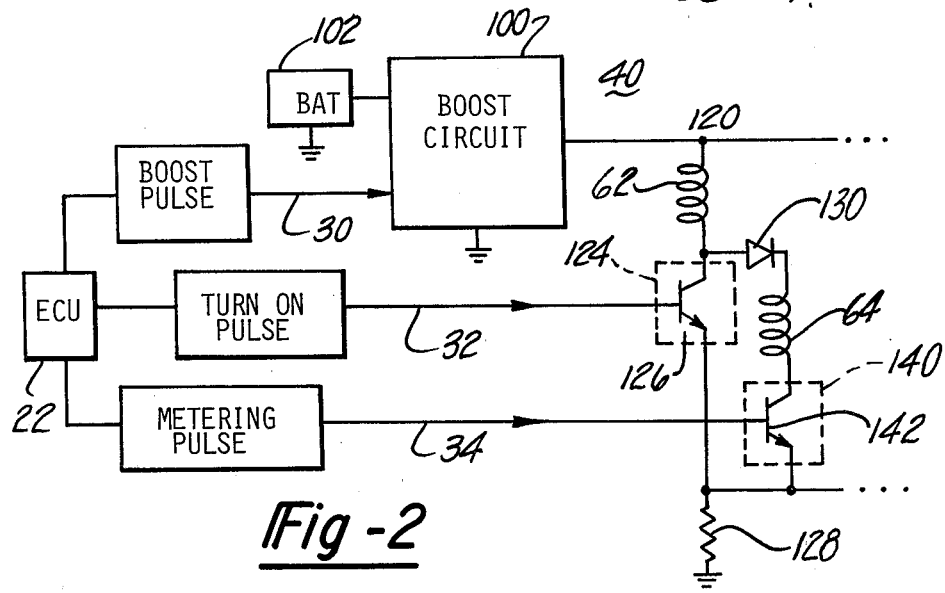
FIG. 2 is a schematic diagram of a driver circuit for a two coil solenoid.

Reference is made to FIG. 2 which illustrates a more detailed schematic diagram of the present invention and more specifically illustrates a driver circuit 40 for controlling the operation of an injector 50 having a solenoid comprising a first or pull-in coil 62 and a second or hold coil 64. The driver circuit 40 includes a boost circuit 100 connected to a source of potential energy such as battery 102. The boost circuit 100 is further adapted to receive at an input terminal a timing signal or boost pulse, $e_B$, transmitted from the electronic control unit 22 via line 30. This timing signal is a relatively short pulse width signal and serves to activate the boost circuit 100 in order to develop a control voltage having a magnitude significantly higher than that of the battery voltage and to supply this boosted voltage to increase the response time of the pull-in coil 62. The output of the boost circuit 100 is connected to one terminal 120 of the pull-in coil 62. The other terminal of the pull-in coil 62 is connected to ground via a switching means 124 such as through the collector emitter path of transistor 126 and a current limiting resistor 128. The switching means 124 is adapted to receive, via line 32, another pulse such as a turn-on pulse $e_p$, from the electronic control unit 22. One terminal of the hold coil 64 is connected to the pull-in coil 62 via an isolation diode 130. The other terminal of the hold coil 64 is connected to a second switching means 140 which is adapted to receive the metering signal, $e_H$, from the electronic control unit 22 via line 34. As illustrated in FIG. 2, the switching means 140 may include a transistor 142 having its base connected to line 34, its collector connected to the hold coil 64 and its emitter connected to ground via a current limiting resistor 128. In addition, other coils may be connected to the boost circuit 100 and the electronic control unit 22 in a similar manner.

Heat generation is reduced and boost voltage distribution is simplified by winding the pull-in coil 62 and the hold coil 64 about the same magnetic core. This arrangement permits a rapid transfer of magnetic and electrical energy from the pull-in coil 62 to the hold coil 64. It is desirable to fabricate the pull-in coil 62 to be a low inductance coil and the hold coil 64 to be a large inductance coil. The utilization of a two coil solenoid allows freedom in designing a low inductance pull-in coil 62 for fast pull-in response and for designing a many turn, high inductance, low resistance hold coil 64 for low power dissipation during the time that injector 50 is in a fuel metering mode of operation.

In general, the operation of the circuit illustrated in FIG. 2 is as follows. At some point in time, prior to the injection of fuel from the metering chamber (not shown) of the injector 50, the electronic control unit 22 will issue, on line 30, a boost pulse signal, $e_B$, to the boost circuit 100. This signal causes the boost circuit 100 to transfer energy from the battery 102 to generate a voltage that is significantly higher than the battery voltage. The application of this increased voltage to the pull-in coil 62 will tend to reduce the time required for the build-up of current flow through the pull-in coil 62. As an example, an automotive battery voltage will typically produce an output voltage of approximately 12 volts, while the output of the boost circuit 100 may be in the vicinity of 80 to 150 volts. After the generation of the boost pulse, the electronic control unit 22 then generates a short second signal of turn-on pulse, $e_p$, which causes the boosted voltage to be transferred to the pull-in coil 62. The turn-on pulse $e_p$, is preferably phased such that it begins approximately at the time the boost pulse $e_B$ terminates. The electronic control unit 22 then generates a third signal such as the metering pulse $e_H$, on line 34 having a larger and variable duration. The metering pulse activates the second switching means 140 which transfers the electrical energy from the battery 102 and the pull-in coil 62 to the hold coil 64. The hold coil 64 is maintained in an energized state during the entire metering interval during which time fuel enters the metering chamber of the injector 50. As will be discussed below, the turn-on pulse and the metering pulse may be generated simultaneously or time shifted, one relative to the other.

Figure 3:
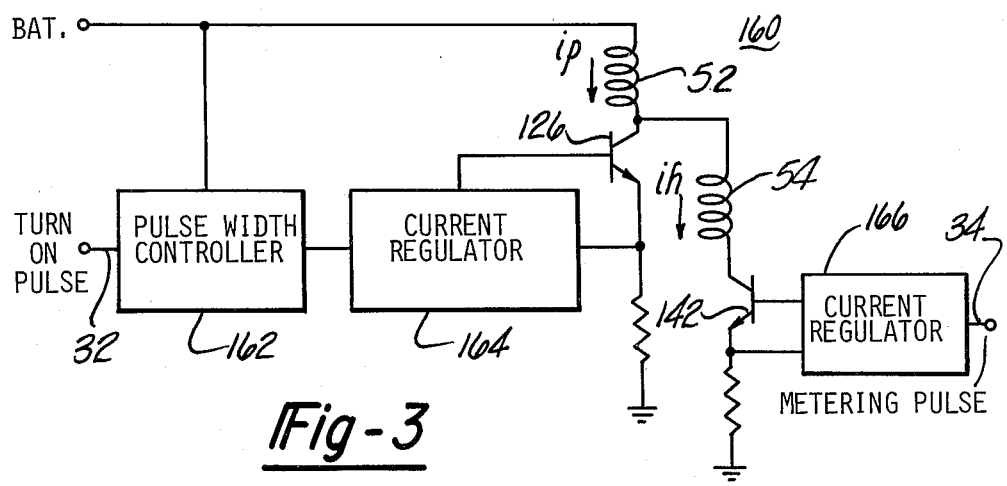
FIG. 3 is an alternate driver for such a solenoid.

Reference is briefly made to FIG. 3 which illustrates an alternate two coil driver circuit 160. This circuit 160 eliminates the need for the boost circuit 100. Circuit 160 includes a pulse width controller 162 which functions to modify the duration of the turn-on pulse as a function of engine parameters including battery voltage. The pulse width controller 162 may be implemented as a look up table within the electronic control unit 22 or incorporated in the driver circuit 160. The driver circuit 160 may further include current regulators 164 and 166 to maintain the level of pull-in current and of the hold current at regulated values during solenoid operation.

Figure 4:
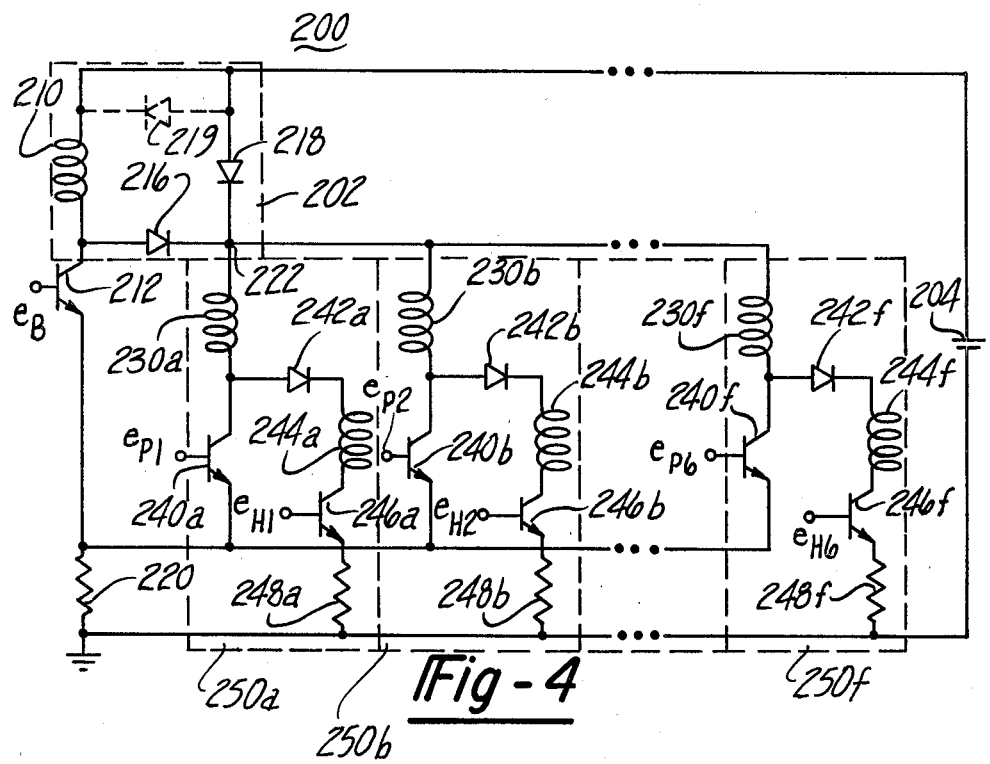
FIG. 4 is an electronic driver circuit for a 6 cylinder engine.

FIG. 4 is a more detailed embodiment of the schematic diagram of FIG. 2. More specifically, FIG. 4 illustrates a driver circuit 200 for controlling a plurality of injection circuits 250a.–f, wherein each injection circuit 250 contains like components having similar reference numerals. The structure and method of operation of the driver circuit 200 will be explained for one injection circuit 250 is as much as each injection circuit is the same. It should be noted that while FIG. 4 illustrates a driver circuit communicating with six (6) injection circuits 250, the present invention is not so limited. The driver circuit 200 comprising a pulsed high voltage generator circuit 202 comprising an inductor or boost coil 210, a switching transistor 212 and the blocking diodes 216 and 218. The positive terminal of the battery 204 is connected to a first terminal of the inductor 210. The other terminal of the inductor 210 is connected to the collector of the transistor 212. The emitter of the transistor 212 is connected to ground through the current limiting resistor 220. The base terminal of the transistor 212 is adapted to receive the boost voltage pulse ($e_B$). The cathode terminal of each of the diodes 216 and 218 are connected together at a junction or node 222. The anode terminal of the diode 216 is connected to the junction between the inductor 210 and the switching transistor 212. The anode terminal of the diode 218 is connected to the first terminal of the inductor 210 and to the positive terminal of the battery 204. One terminal of the pull-in coil 230a is connected to the collector of the transistor 240a. The base terminal of the transistor 240a is adapted to receive the pull-in pulse, $e_p$, from the ECU 22. The emitter of the transistor 240a is connected to one terminal of the current limiting resistor 220. In addition, the other terminal of the pull-in coil 230a is connected through the isolation diode 242a to one terminal of the hold coil 244a. The other terminal of the hold coil 244a is connected through the collector-emitter path of the switching transistor 246a to a current limiting resistor 248a. The base of the switching transistor 246a is adapted to receive the variable duration metering pulse $e_H$. If the pull-in pulse ($e_p$) and boost voltage pulse ($e_B$) are not properly synchronized it may be necessary to utilize an additional blocking diode 219 (shown in phantom lines) inserted between the first terminal of the inductor or boost coil 210 and the cathode of the diode 218 to protect the battery 204 from voltage surges.

A feature of the present invention is that by utilizing a solenoid having two coils such as coils 230a and 244a that are wound about a common core, heat generation can be minimized and the design of the solenoid boost voltage generator 202 is greatly simplified. The operation of the circuit shown in FIG. 4 is similar to that of FIG. 2 and is described in conjunction with the timing diagram of FIG. 5.

Figure 5:
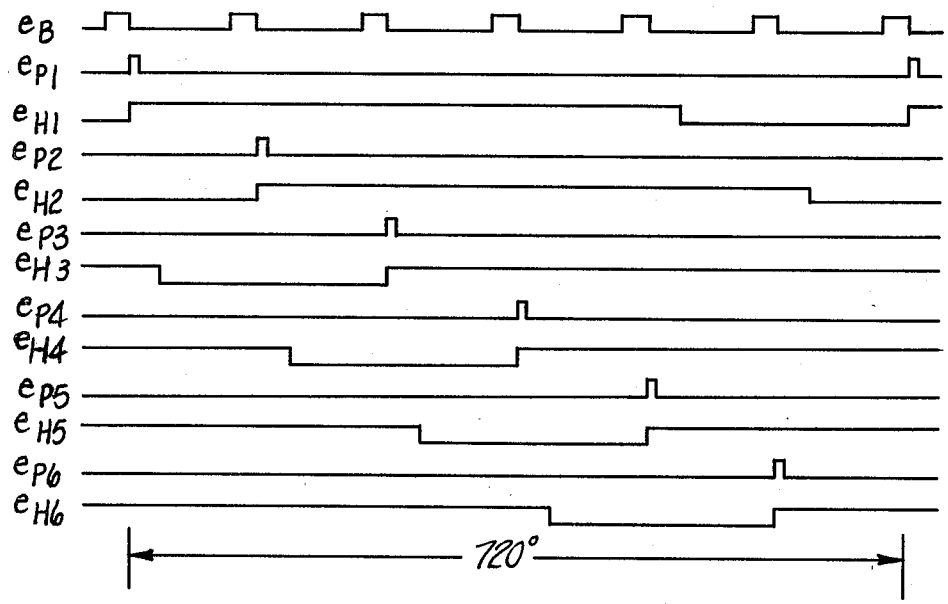
FIG. 5 is a timing diagram for a 6 cylinder, 4 cycle engine.

FIG. 5 illustrates one complete cycle of operation which corresponds to two rotations (720 degrees) of the engine crankshaft. The $e_B$ pulse (line 1, FIG. 5) is a periodically recurring boost voltage timing signal for each cylinder that is generated in synchronism with the combustion process for that cylinder. At the beginning of each pulse interval transistor 212 is made conductive therein creating a current charging path from battery 204 to ground through inductor or boost coil 210 and the current limiting resistor 220. After a predetermined interval, as determined by the pulse width of the $e_B$ pulse, the transistor 212 is turned off thereby generating the boosted value of voltage and transistors 240 and 246 are simultaneously turned on by the pull-in and metering pulses (lines 2 and 3, FIG. 5). By virtue of turning off the transistor 212 and turning on the transistors 230a and 244a, the current flowing through the boost coil 210 and current from the battery 204 is given an alternative current flow path. The boost current now flows to ground through the pull-in coil 230a, the transistor 240a and through the resistor 220. Because the pull-in coil 230 has been chosen to be a low inductance high current coil, a high valued, fast rising electromagnetic force is created to move the armature of the solenoid thereby permitting fuel to begin to flow into the metering chamber. It is not necessary to stagger the application of the pull-in and metering pulses since current will not initially flow through the hold coil 244a because of its high inductance. A magnetic flux having a magnitude in excess of that necessary to hold the armature in an activated position will be established in the solenoid core by virtue of the current flowing through the pull-in coil 230 at the end of the pull-in pulse. The duration of each metering pulse (line 3, FIG. 5) is dictated by the instantaneous performance requirements of the engine and by the flow capacity of the fuel system components. As an example, the duration of the metering pulse may be as short as the duration between successive boost pulses or span a number of such pulses. The physical injection of fuel into each cylinder occurs after the termination of, and before the next metering pulse for a particular cylinder. The precise timing of the initiation of fuel injection varies with engine demand and engine control philosophy. Lines 4-13 of FIG. 5 illustrate the pull-in and metering pulse, for the other cylinders of a six cylinder engine.

Many changes and modifications in the above described embodiment of the invention can of course be carried out without departing from the scope thereof. Accordingly, that scope is intended to be limited only by the scope of the appended claims.

What is claimed is:

1. A fuel control system for an internal combustion engine comprising:
   at least one fuel injector adapted to receive fuel and for injecting a determinable quantity of fuel to a cylinder of the engine, including metering chamber means for storing the determinable quantity of the received fuel prior to the injection of the fuel into the cylinder and solenoid means operatively situated relative to said metering chamber means for selectively permitting, upon activation, the received fuel to flow therein, said solenoid means including a first or pull-in coil and a second or hold coil that are magnetically coupled to each other;
   generator means responsive to at least one engine operating parameter for generating a plurality of pulse train signals, phased relative to one another and synchronized to the combustion process within the engine for energizing of said solenoid means for controlling the activation time of said solenoid means and for controlling the duration of fuel flow to said metering means;
   source means, including a battery, for providing a ready source of electrical energy;
   boost means, responsive to a first pulsed signal of said plurality of signals for generating a first voltage greater than the voltage of said source means comprising:
   a boost coil connected to said source means;
   first switch means, including a first transistor, connected to said boost coil, for transferring a first quantity of electrical energy from said source means to said boost coil in response to said first pulsed signal;
   first and second diodes having their cathode terminals connected in common and having the anode of said first diode connected to said source means and having the anode of said second diode connected to said boost coil at the junction of said boost coil and said first switch means;
   current limiting means, including a first resistor connected to said first switch means for limiting the current flow therethrough;
   second switch means, one associated with each of said at least one fuel injector, responsive to a second pulsed signal of said plurality of pulsed train signals and connected to one terminal of said pull-in coil for permitting current to flow through said pull-in coil in timed relationship with the generation of the first pulsed signal and wherein the other terminal of said pull-in coil is connected to the anode of said first diode;
   a third diode, one associated with each of said at least one fuel injector having its anode connected to said one terminal of said pull-in coil, and its cathode connected to a first terminals of said hold coil;
   third switch means, one associated with each said at least one fuel injector and responsive to a third pulsed signal of said plurality of pulsed train signals and connected to a second terminal of said hold coil for activating said hold coil to maintain said solenoid means in an activated state thereby permitting continued fuel flow into said metering chamber means.

2. The system as defined in claim 1 wherein said solenoid means further includes a core and wherein said pull-in coil and said hold coil are wound about said core.

3. The system as defined in claim 2 wherein said pull-in coil has a lower inductance than said hold coil.

4. The system as defined in claim 3 further including a diode means interposing said boost coil and the cathode of said first diode for preventing current flow from said boost coil to said source means.

5. The system as defined in claim 4 wherein said second switch means is connected to said current limiting means and wherein said third switch means is connected to ground potential through a current limiting resistor.

6. The system as defined in claim 5 wherein said second and said third switch means are energized simultaneously.

7. The system as defined in claim 6 having means to energize said third switch means at a determinable time period after the energization of said second switch means.

8. The system as defined in claim 7 wherein said pull-in coil and said hold coil are connected in series.

9. A circuit for activating at least one fuel injector of an internal combustion engine, the at least one fuel injector including:
   solenoid means including a first or pull-in coil and a second or hold coil that are magnetically coupled to each other, the circuit comprising:
   generator means responsive to at least one engine operating parameter for generating a plurality of pulse train signals, phased relative to one another and synchronized to the combustion process within the engine for energizing of said solenoid means, for controlling the activation time of said soneoid means;
   source means, including a battery, for providing a ready source of electrical energy;
   boost means, responsive to a first pulsed signal of said plurality of signals for generating a first voltage greater than the voltage of said source means comprising:
      a boost coil connected to said source means;
      first switch means, including a first transistor, connected to said boost coil, for transferring a first quantity of electrical energy from said source means to said boost coil in response to said first pulsed signal;
      first and second diodes having their cathode terminals connected in common and having the anode of said first diode connected to said source means and having the anode of said second diode connected to said boost coil at the junction of said boost coil and said first switch means;
   current limiting means, including a first resistor connected to said first switch means for limiting the current flow therethrough;
   second switch means, one associated with each of said at least one fuel injector, responsive to a second pulsed signal of said plurality of pulsed train signals and connected to one terminal of said pull-in coil for permitting current to flow through said pull-in coil in timed relationship with the generation of the first pulsed signal and wherein the other terminal of said pull-in coil is connected to the anode of said first diode;
   a third diode, one associated with each said at least one fuel injector having its anode connected to said one terminal of said pull-in coil, and its cathode connected to a first terminal of said hold coil;
   third switch means, one associated with each said at least one fuel injector and responsive to a third pulsed signal of said plurality of pulsed train signals and connected to a second terminal of said hold coil for activating said hold coil to maintain said solenoid means in an activated state thereby permitting continued fuel flow into said metering chamber means.

10. The circuit as defined in claim 9 wherein said solenoid means further includes a core and wherein said pull-in coil and said hold coil are wound about said core.

11. The circuit as defined in claim 10 wherein said pull-in coil has a lower inductance than said hold coil.

12. The circuit as defined in claim 11 further including a diode means interposing said boost coil and the cathode of said first diode for preventing current flow from said boost coil to said source means.

13. The circuit as defined in claim 12 wherein said second switch means is connected to said current limiting means and wherein said third switch means is connected to ground potential through a current limiting resistor.

14. The circuit as defined in claim 13 wherein said second and said third means are energized simultaneously.

15. The circuit as defined in claim 14 having means to energize said third switch means at a determinable time period after the energization of said second switch means.

16. The circuit as defined in claim 15 wherein said pull-in coil and said hold coil are connected in series.

* * * * *